M. STEGER.
APPARATUS FOR SEPARATING PARTICLES OF LIQUID FROM GASES AND VAPORS.
APPLICATION FILED JULY 1, 1909.

940,947.

Patented Nov. 23, 1909.

Witnesses:
Edward Schow
W. R. Schulz

Inventor:
Moritz Steger
by his attorney
Frank v. Briesen

UNITED STATES PATENT OFFICE.

MORITZ STEGER, OF BOCHUM, GERMANY.

APPARATUS FOR SEPARATING PARTICLES OF LIQUID FROM GASES AND VAPORS.

940,947. Specification of Letters Patent. Patented Nov. 23, 1909.

Application filed July 1, 1909. Serial No. 505,352.

*To all whom it may concern:*

Be it known that I, MORITZ STEGER, a citizen of the German Empire, and resident of 29 Ehrenfelderstrasse, Bochum, Germany, have invented new and useful Improvements in Apparatus for Separating Particles of Liquid from Gases and Vapors, of which the following is a specification.

For separating from gases and vapors, finely divided but liquid substances such as tar, oil and the like, apparatus is in some cases used, which effects the separation by means of powerful mechanical action on the gas or vapor. The action referred to may be frictional, centrifugal or due to impact with solid substances, or the like, the gas or vapor being at the same time divided into separate streams by passing through perforated baffles or sieves.

The present invention relates to apparatus of this type, and its object is to provide apparatus wherein all the mechanical actions cited are collectively produced, for the purpose of obtaining the highest possible efficiency. For this purpose the gas or vapor is passed first through a fixed sieve and then through a rotating sieve arranged behind the same, the effect of the rotating sieve being to deflect the streams of gas or vapor and produce powerful frictional and centrifugal action. Any number of alternate fixed and rotating sieves, may of course be used in succession.

Apparatus embodying this improvement is shown in the annexed drawing, in which—

Figure 1:
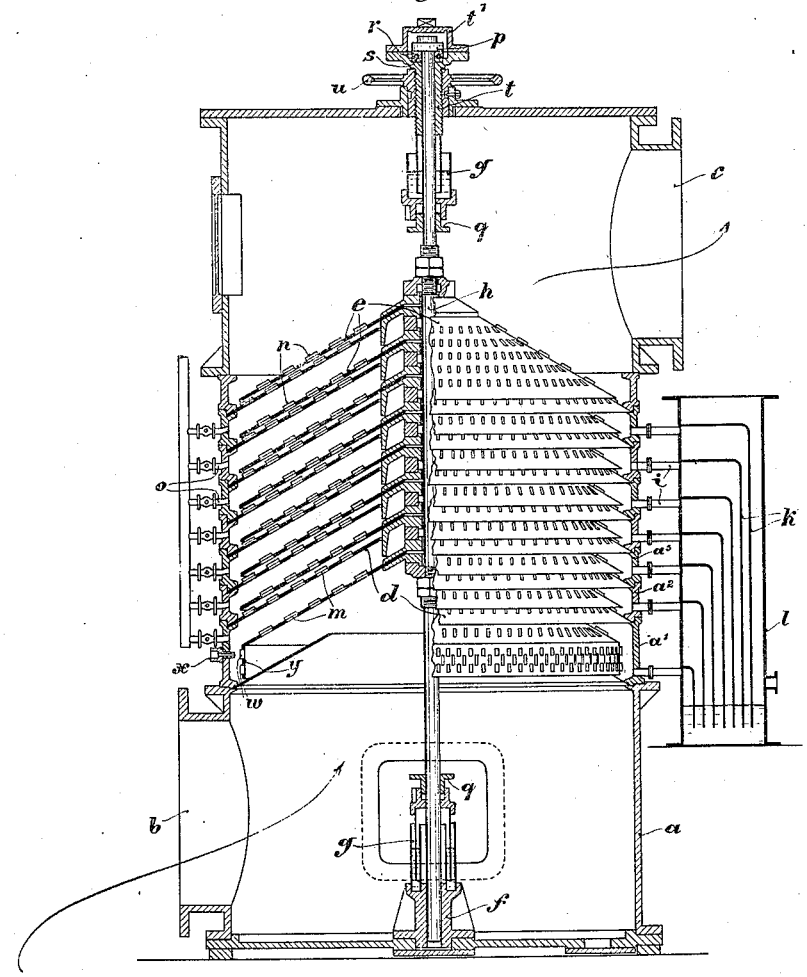
Figure 2:
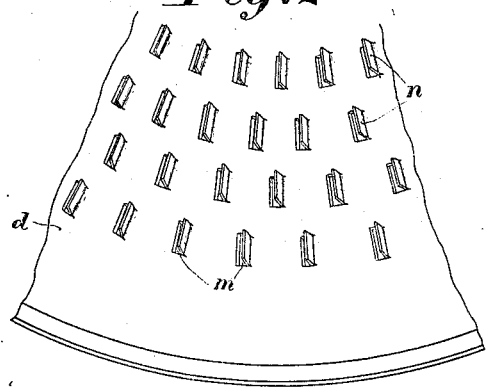

Figure 1 is a vertical cross-section of the apparatus and Fig. 2 an elevation of part of one of the sieves, drawn to a larger scale.

The term "gas" will be used hereinafter in a general sense to include vaporous substances.

Referring to the drawing, the gas enters the casing or chamber $a$ at $b$ and passes out at $c$. The casing contains a plurality of superposed, conical, perforated plates $d$. To facilitate the assemblage the casing is in part built up of separate rings $a^1$, $a^2$, $a^3$ etc. The perforated plates $d$ are arranged in the casing alternately with rotatable perforated plates $e$, which are fixed to a vertical axle having bearings $f$ and $p$. Hydraulic seals $g$ and stuffing-boxes $q$ make gas-tight joints where the axle enters its bearings. The axle has at its upper end a collar $r$ resting on a ring of anti-friction balls $s$ on a ball-race within a hollow spindle $t$. To prevent the lifting of the axle by gas-pressure it is held down by a yoke $t^1$. Balls may be interposed between the axle and yoke to reduce friction. A screw-threaded sleeve $u$, with a hand-wheel fixed thereto, engages the spindle $t$ and enables the axle to be vertically adjusted for the purpose of adjusting the distance of the rotatory plates $e$ from the adjacent plates $d$.

The apex angle of the conical plates is approximately 120 degrees. With this angle the separated liquid flows freely down the surface of the plates $d$. The circumferential parts of the plates $d$ form, in conjunction with the wall of the casing $a$, annular troughs which communicate with discharge pipes $i$. The latter terminate in separate compartments of a vessel $l$, the partitions $k$ between the said compartments being sealed at the bottom by liquid.

Fig. 2 shows a portion of a conical plate $d$ having quadrangular apertures $m$. The apertures may conveniently measure 8 millimeters by 2 millimeters and are formed by cutting through the plate at three sides of the part to be apertured, and bending out the partly severed material to form a lug $n$, which serves as a kind of vane. The stream of gas flowing through the aperture $m$ impinges against the lug $n$ and the particles of liquid carried by the gas are thrown forcibly outward in a tangential direction by impact with the lug. If the lugs are given a slight inclination, as shown in the drawing, the gas exerts a turning effort, as a turbine, the fixed plates $d$ acting as guides and the plates $e$ as rotors. The pressure of the gas is in most cases sufficient to impart rapid rotation to the plates $e$, the resistance offered to this rotation being very slight.

The apparatus illustrated is suitable for use as a tar separator. For using it at the same time as an ammonia washer, pipes $o$ are joined to the rings $a^1$, $a^2$, $a^3$ etc., and water under pressure is introduced through these pipes into the chambers between the plates. If the tar is rich in naphthalene the said pipes may be used for blowing through the apparatus.

To enable an auxiliary blower, with nozzle $x$, to be used if necessary for imparting rotation to the plates $e$, the undermost plate $e$ has a cylindrical flange $y$ on which a series of vanes $y$ are formed, for example by bending out portions of the material. These vanes are staggered, so that the axle can be vertically moved, within limits, without interfering with the drive imparted by the blower.

What I claim is:—

1. A device of the character described, comprising a casing, a series of inclosed perforated movable plates, a series of intervening perforated fixed plates, and vanes projecting from the fixed plates.

2. A device of the character described, comprising a casing, a series of inclosed perforated movable plates, a series of intervening perforated fixed plates, and inclined integral vanes projecting from the fixed plates.

3. Apparatus for separating, from gases or vapors, particles of liquid such as tar, oil and the like, comprising a casing having inlet and eduction orifices, fixed perforated conical baffle plates in said casing and perforated rotary baffle plates fixed to vertical axle and alternating with said fixed plates, each of said fixed baffle plates being joined to the wall of the casing to form therewith an annular trough substantially as described.

4. Apparatus for separating, from gases or vapors, particles of liquid such as tar, oil and the like, comprising a casing having inlet and eduction orifices, fixed perforated conical baffle plates in said casing, and perforated rotatory baffle plates fixed to vertical axle and alternating with said fixed plates each of said fixed baffle plates being joined to the wall of the casing to form therewith an annular trough and the annular trough being collectively in communication with a discharge receptacle, substantially as described.

5. Apparatus for separating, from gases or vapors, particles of liquid such as tar, oil and the like, comprising a casing having inlet and eduction orifices, fixed perforated baffle plates in said casing, and rotatory perforated baffle plates alternating with said fixed baffle plates, the distance between the fixed plates and rotatory plates being adjustable from outside the casing, substantially as described.

6. Apparatus for separating, from gases or vapors, particles of liquid such as tar, oil and the like, comprising a casing having inlet and eduction orifices, fixed perforated baffle plates in said casing, and rotatory perforated baffle plates alternating with said fixed baffle plates, the distance between the fixed plates and rotatory plates being adjustable from out-side the casing, by means of a screw spindle adapted to vertically adjust a suspension bearing of the axle carrying the rotatable plates, substantially as described.

7. Apparatus for separating, from gases or vapors, particles of liquid such as tar, oil and the like, comprising a casing having inlet and eduction orifices, fixed perforated baffle plates in said casing, and rotatory perforated baffle plates alternating with said fixed baffle plates, the distance between the fixed plates and rotatory plates being adjustable from outside the casing, and the undermost rotatable baffle plate having a cylindrical flange on which vanes are formed in a position to receive the impact of a propelling jet issuing from a nozzle.

Signed by me at Barmen, Germany, this 19th day of June 1909.

MORITZ STEGER. [L. S.]

Witnesses:
  OTTO KÖNIG,
  WILLY KLEIN.